(No Model.) 5 Sheets—Sheet 3.

F. MEISEL.
MACHINE FOR CUTTING INTO STRIPS AND REELING OR WINDING PAPER.

No. 492,964. Patented Mar. 7, 1893.

Witnesses.
Harry W. Aiken
Philip A. Sullivan

Inventor.
Francis Meisel
by F. E. Tschemacher
Atty (No Model.) 5 Sheets—Sheet 4.
F. MEISEL.
MACHINE FOR CUTTING INTO STRIPS AND REELING OR WINDING PAPER.
No. 492,964. Patented Mar. 7, 1893.
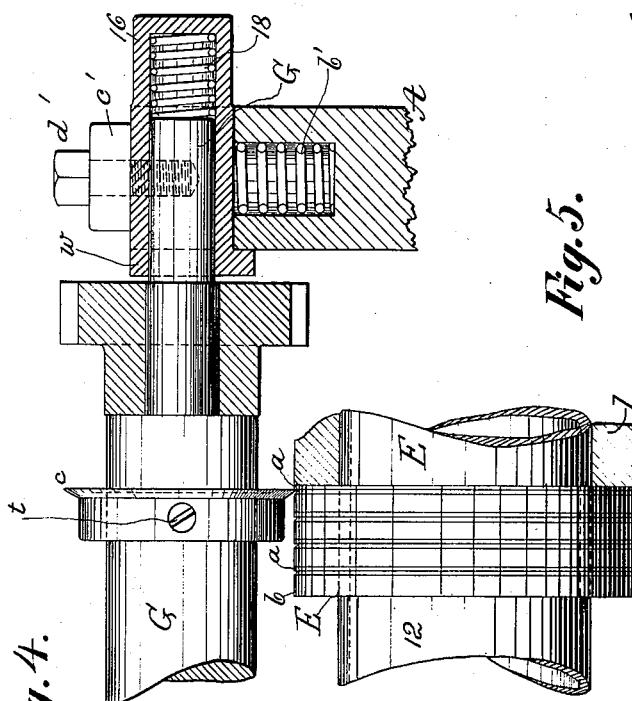
Fig. 4.
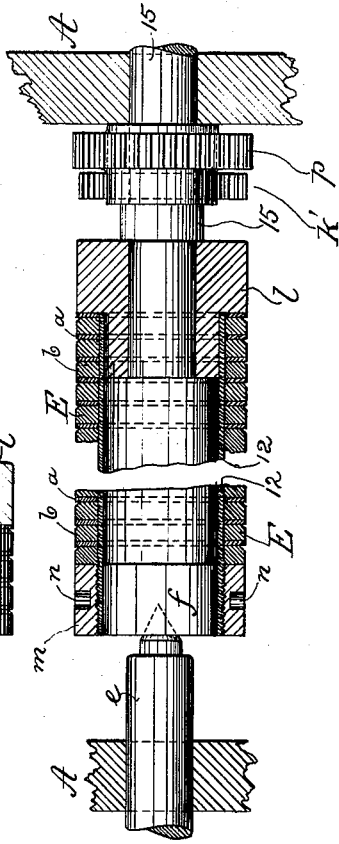
Fig. 5.
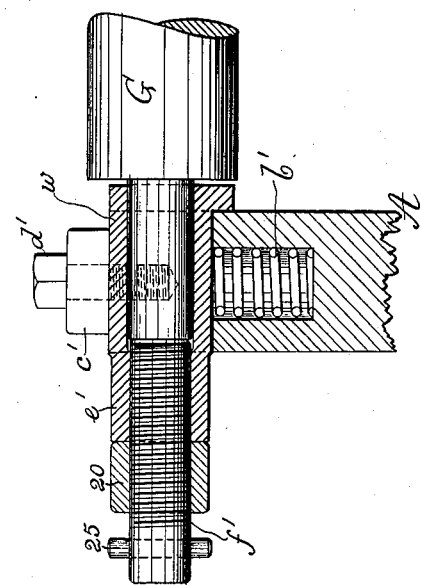
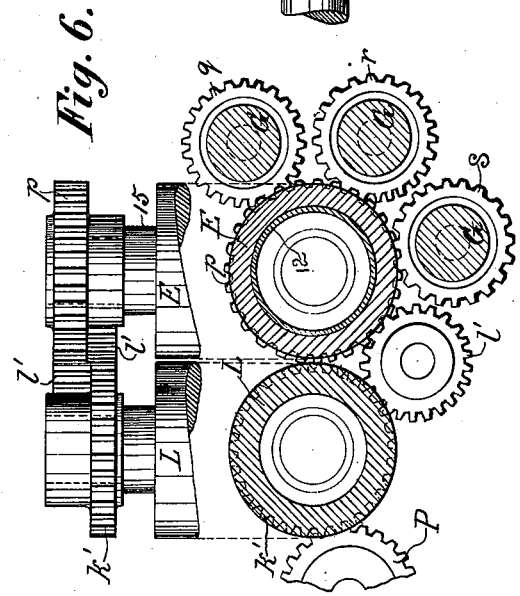
Fig. 6.
Witnesses
Harry W. Aiken
Philip A. Sullivan
Inventor.
Francis Meisel
by P. E. Teschemacher
Atty (No Model.) 5 Sheets—Sheet 5.
F. MEISEL.
MACHINE FOR CUTTING INTO STRIPS AND REELING OR WINDING PAPER.
No. 492,964. Patented Mar. 7, 1893.
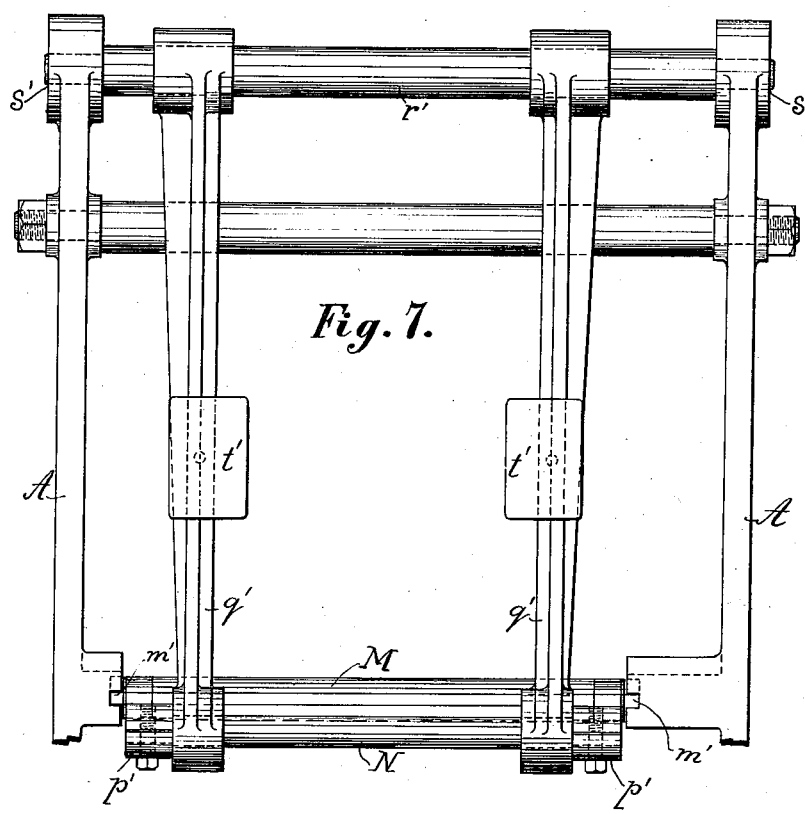
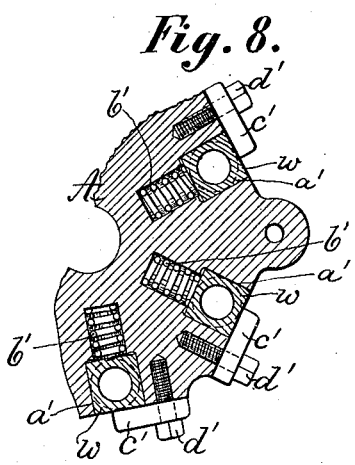
Witnesses. Inventor.

UNITED STATES PATENT OFFICE.

FRANCIS MEISEL, OF BOSTON, MASSACHUSETTS.

MACHINE FOR CUTTING INTO STRIPS AND REELING OR WINDING PAPER.

SPECIFICATION forming part of Letters Patent No. 492,964, dated March 7, 1893.

Application filed May 21, 1892. Serial No. 433,921. (No model.)

*To all whom it may concern:*

Be it known that I, FRANCIS MEISEL, a citizen of the United States, residing at Boston, in the county of Suffolk and State of Massachusetts, have invented certain Improvements in Machines for Cutting into Strips and Reeling or Winding Paper, Card-Board, Cloth, and other Similar Material, of which the following is a full, clear, and exact description, reference being had to the accompanying drawings, making part of this specification, in which—

Figure 1:
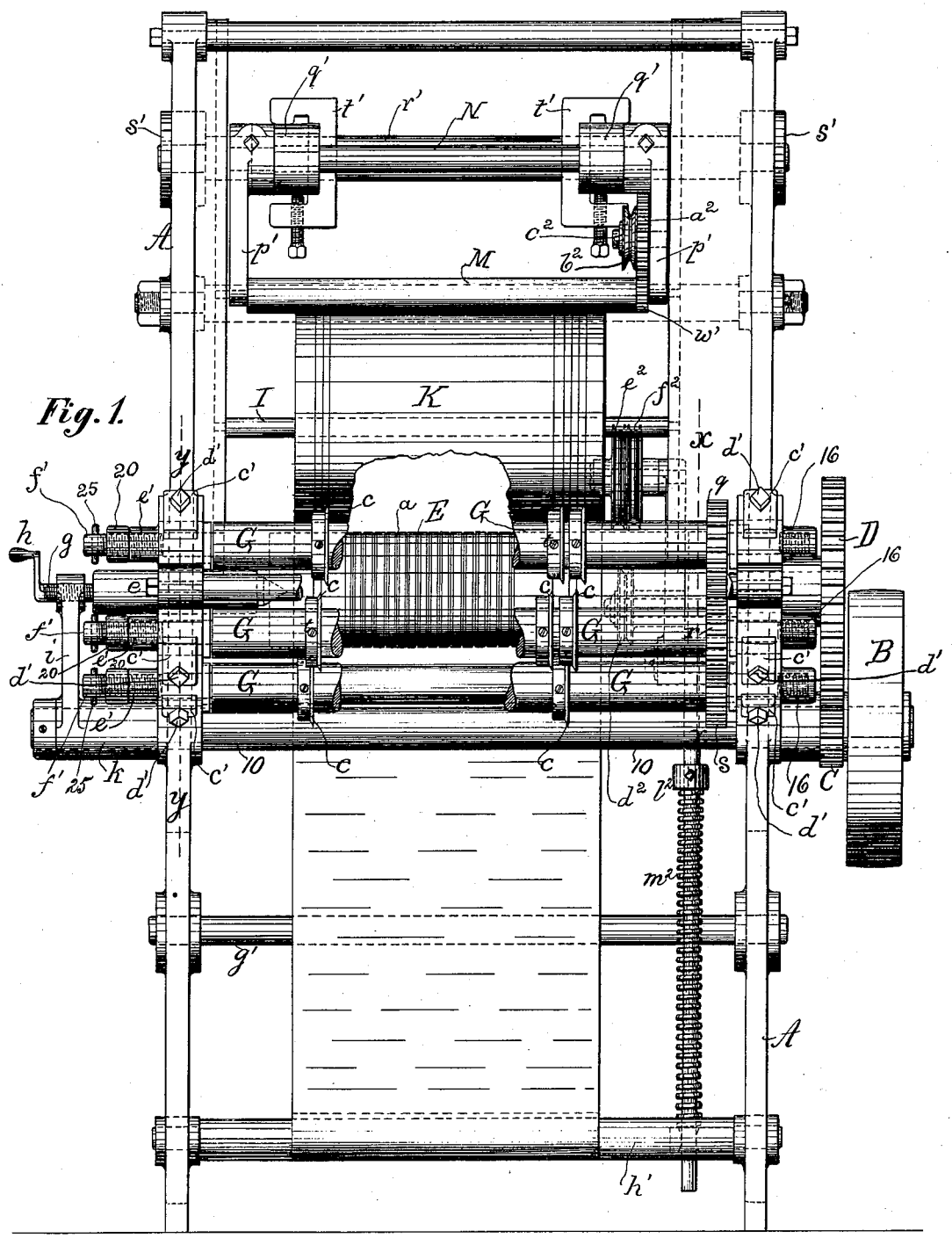
Figure 2:
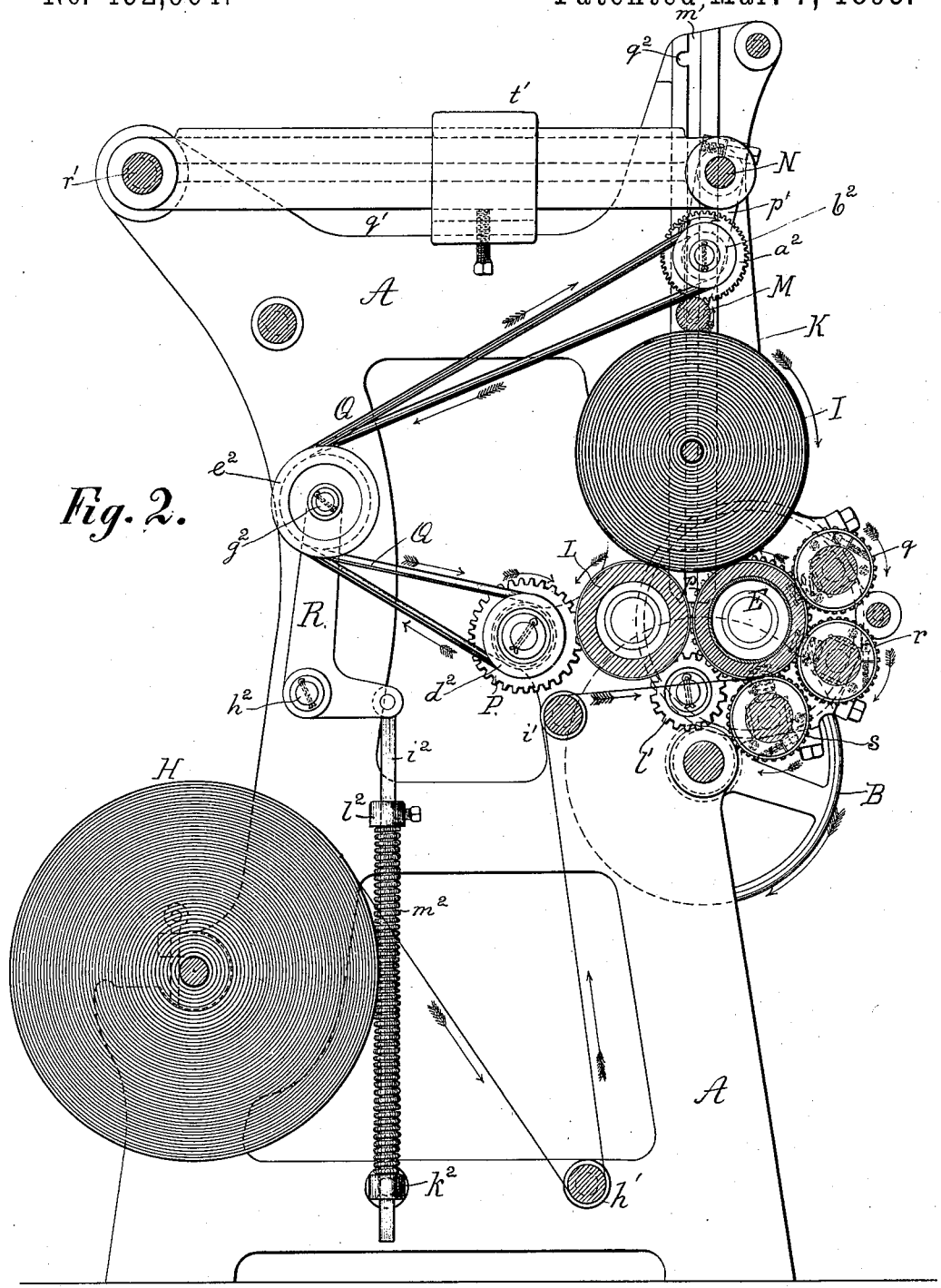
Figure 3:
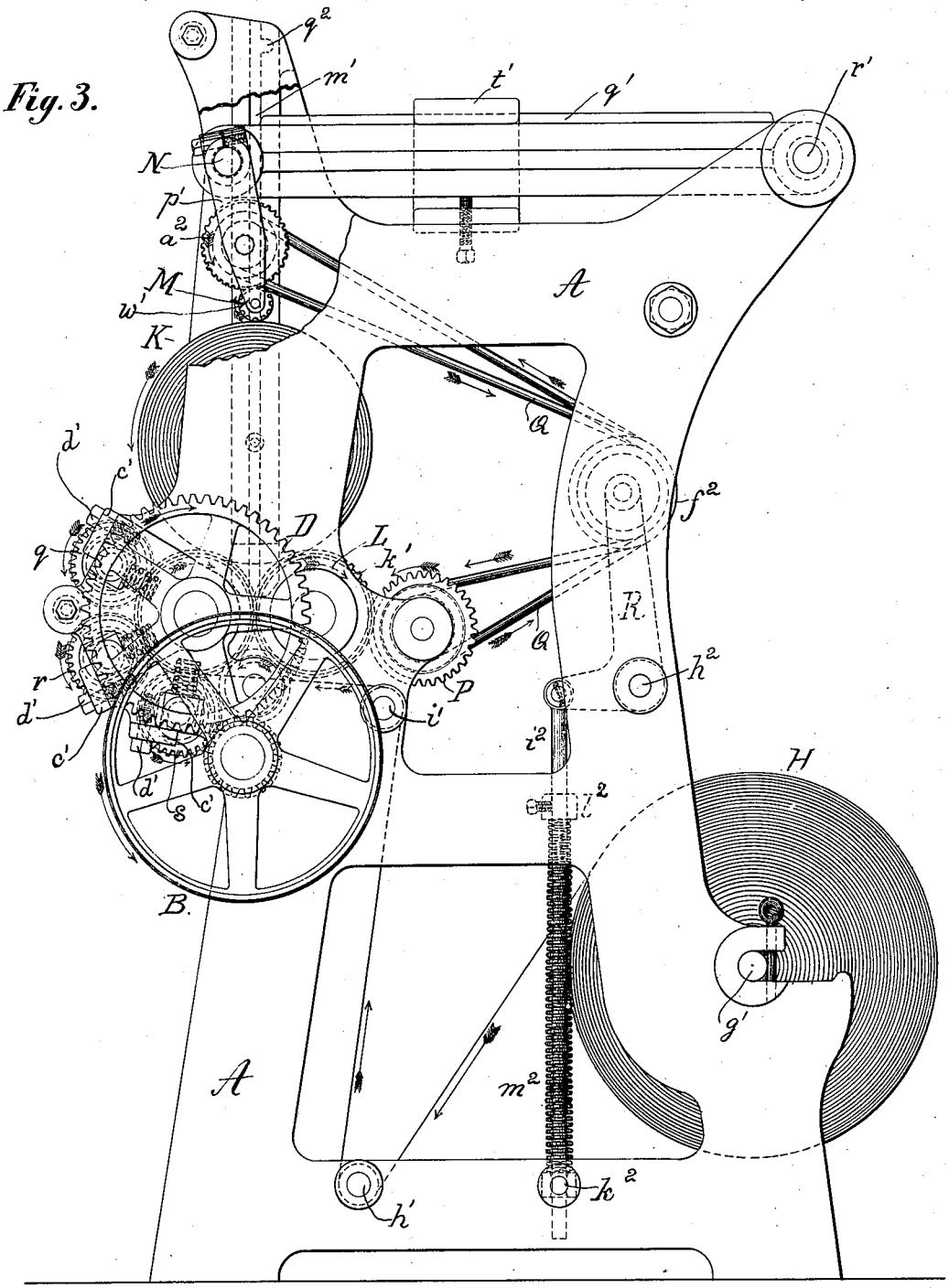

Figure 1 is a front elevation of my improved machine for cutting into strips and winding paper, card board, &c., a portion of the paper being operated upon, and also a portion of the cutter shafts in front, being broken away to show the parts behind. Fig. 2 is a transverse vertical section through the center of the machine. Fig. 3 is a side elevation of the machine. Fig. 4 is an enlarged detail of one of the small cutter shafts and a portion of the larger cutter shaft which co-operates therewith. Fig. 5 is a sectional detail of the large cutter shaft, illustrating the manner in which it is supported at its ends. Fig. 6 is a sectional detail on the line $x, x$ of Fig. 1, showing the arrangement of the gears inside the framework at one end of the machine. Fig. 7 is a plan showing the swinging pressure roll frame at the top of the machine. Fig. 8 is a sectional detail on the line $y, y$ of Fig. 1, showing the arrangement of the journal boxes of the small cutter shafts.

My invention relates to an improved machine for cutting into strips paper, card-board, cloth, and other similar material, and reeling or winding it up into rolls, and has for its object to perform these operations in a more perfect and satisfactory manner than heretofore.

To this end my invention consists in certain novel combinations of parts and details of construction as hereinafter set forth and specifically pointed out in the claims.

In the said drawings, A represents the framework of the machine, outside of which upon a suitable stud formed at the end of a tie-bar 10 is mounted the driving pulley B, upon the hub of which is a pinion C which meshes with and drives the gear D secured to the end of a friction feed or winding cylinder E, consisting of a tubular shell or core-shaft 12, over which are placed a series of thin steel cutting disks $a$, and rings or collars $b$ of the same diameter, the collars $b$ being chamfered off at one edge as seen in Figs. 4 and 5, to allow the smaller cutting disks $c$, Figs. 1 and 4, to co-operate therewith and cut the paper into strips of the desired width.

The cutting disks $a$ are made reversible in order that both edges may be utilized, and the rings or collars $b$ may be of different widths, and may be so arranged in connections with the disks $c$ as to cut a series of strips of different widths at the same time. The cylinder E is provided at one end with a supporting shaft 15, the journal of which runs in a box or bearing in one side of the framework, while the opposite end of the cylinder E is supported by and runs upon a sliding center pin $e$, which enters a conical recess in a plug $f$ driven into the end of the core-shaft 12, as seen in Fig. 5, said center pin $e$ being held in position by a screw $g$, Fig. 1, provided with a crank handle $h$ and mounted in an arm $i$ provided with a hub or sleeve $k$ turning freely on a stud outside the framework formed on one end of the tie bar 10, whereby the arm $i$ with the screw $g$ may be readily swung to one side to permit the center-pin $e$ to be withdrawn to enable the cutting disks and collars on the cylinder E to be quickly removed and changed to cut strips of different widths.

At one end of the cylinder E is a shoulder $l$, Figs. 4 and 5, and at the opposite end a threaded collar or nut $m$ of the same diameter as the rings and disks, and provided with holes $n$ for a wrench, whereby said nut may be screwed over one end of the core-shaft 12 tightly up against the last ring of the series to clamp the rings and cutters upon the cylinder.

On the supporting shaft 15 of the cylinder E inside the framework, is a gear $p$ which meshes with and drives the gears $q, r, s$, Figs. 1 and 6, fast on the shafts G, which carry the small circular knives or cutting disks $c$ secured to their shafts by means of screws $t$, whereby they may be adjusted longitudinally on said shafts to correspond to the positions of the large cutting disks $a$ of the cylinder E with which they co-operate. The cutter shafts G have their bearings in boxes $w$ which are placed, as seen in Figs. 4 and 8, in radial slots a' in the sides of the framework A, in suitable recesses at the bottom of which are placed spiral springs b' which bear against the boxes w and tend to force the same outward against the swinging buttons or latches c' which extend thereover, as seen in Figs. 1, 3, and 8, whereby when the bolts d' on which the buttons are pivoted are loosened, or the buttons are removed or swung to one side, the springs b' will force the shafts G outward away from the cylinder E, thereby withdrawing the smaller cutters c out of contact with the large cutting disks a on said cylinder, as is necessary to permit the end of the roll of paper or other material to pass between the larger and smaller cutters at the commencement of the operation, or when it is desired to remove or adjust the cutting disks for strips of different widths.

The boxes w at the right hand end of the machine are each provided with a tubular extension 16 containing a spiral spring 18 as seen in Fig. 4, and dotted in Fig. 1, which acts against the adjacent end of the shaft G and serves to force it in the proper direction to produce a lateral separation of the cutting disks a and c, which should be effected before the shaft G is forced away by the springs b' from the cylinder E. At the opposite or left hand side of the machine the boxes w are each provided with a tubular extension e', to the outer end of which is fitted, with a check nut 20, a screw f' which bears against the adjacent end of the shaft G, whereby when the screw f' is turned in by means of its handle 25, the shaft G will be moved longitudinally against the influence of the spring 18, and in this manner the entire series of cutters c on the shaft G may be simultaneously adjusted laterally to bring them into proper working contact with the cutting disks a of the cylinder E, thereby avoiding the delay and inconvenience of setting up each cutter separately and independently as has hitherto been customary, and insuring a perfect and uniform working contact between the cutting disks as required to produce a clean smooth cut. In the same manner all of the cutters c upon a shaft G can be withdrawn or separated laterally from their co-operating cutters a at a single operation by a slight backward movement of the screw f' belonging to said shaft, which will permit the spring 18 at the opposite end to force the shaft in the proper direction to effect this movement or adjustment.

When it is desired to cut very narrow strips of paper, the rows of disks c may be arranged as shown in Fig. 1, in connection with their counterpart cutters a, so that those of one row will sub-divide the strips cut by the row above.

The paper or other material to be cut into strips and reeled up is taken from a roll H, Figs. 2 and 3, mounted on a shaft g' having its bearings in the framework of the machine, the paper thence passing under a guide roll h', over a guide roll i', and under and partially around the winding and cutting cylinder E, where it is cut into strips by the circular cutters a and c, said strips being then wound up on a core shaft or mandrel I, and forming a roll K, which rests partially on the cylinder E and partially on another winding drum or cylinder L of the same diameter, and parallel with the cylinder E. The shaft of the cylinder L has secured to it at one end a gear k', Figs. 3 and 6, which meshes with and is driven by an intermediate gear l' which is mounted upon a stud projecting from the framework, and meshes with and is driven by the gear p at the end of the cylinder E. The face of the gear l' is double the width of the gear p to enable it to engage and drive the gear k' which lies in a plane on one side of the gear p as seen in the upper portion of Fig. 6. By thus arranging the gears p, k' in different planes, I am enabled to bring the surfaces or peripheries of the two winding cylinders E, L, very close together, as is necessary to enable me to use a very small core shaft or mandrel upon which to wind the cut strips.

The two cylinders E, L, revolve in the same direction, but the cylinder L, the surface of which is preferably roughened, revolves with a greater surface velocity than the cylinder E by reason of the gear k' being of smaller diameter and having a smaller number of teeth than the gear p, and said cylinders form friction feed or winding cylinders which serve to rotate the roll K by frictional contact therewith, and as the said roll increases in diameter, the ends or journals of the core or mandrel I on which it is wound, rise vertically in guide grooves or ways m', Figs. 2 and 3, in the opposite side of the framework. By thus causing the cylinder L to revolve with a greater surface velocity than the cylinder E, the cut strips are kept stretched over the cylinder E, and tightly wound on the core shaft or roll, one close against the other, without interlapping, whereby the cut rolls can be readily separated and removed from the core shaft.

M is an auxiliary friction winding and pressure roll, which bears upon the top of the roll K and is rotated by mechanism to be presently described with a surface velocity as great or greater than that of the friction winding cylinder L, which, together with its downward pressure, insures the positive rotation of the roll K, particularly when the diameter of the latter is small at the commencement of the operation, and its weight consequently light. The roll M is mounted in a pair of swinging arms p', p', the ends of its journals fitting within the vertical grooves or ways m', whereby as the roll M is raised, it is kept directly over the center of the roll K. The arms p', p', are secured to an oscillating shaft N supported at its opposite ends in bearings in the ends of two swinging arms q', q', secured to a shaft r', oscillating in bearings s', s', in the framework A; said arms q', q', being provided with adjustable weights t', t', for varying the pressure of the roll M on the roll of cut strips K, which is thereby pressed against the friction winding cylinders E, L, with sufficient force to insure its being properly rotated to cause the cut strips of paper to be tightly wound into a solid roll. To one end of the roll M is secured a pinion $w'$, Figs. 1 and 3, which meshes with and is driven by a gear $a^2$ having fastened to one side a sheave or pulley $b^2$, said gear and pulley being mounted on a stud $c^2$ projecting from the inner side of one of the arms $p'$ as seen in Fig. 1.

P is a gear mounted upon a stud projecting from the framework, and meshing with and driven by the gear $k'$ of the cylinder L, as shown in Figs. 2, 3, and 6, said gear P carrying a sheave or pulley $d^2$ from which motion is communicated to the pulley $b^2$, and gear $a^2$, by means of a belt Q which runs over two independent pulleys $e^2$, $f^2$, Fig. 1, running loosely on a stud $g^2$, Fig. 2, projecting from the end of a bell-crank lever R, fulcrumed at $h^2$ and having pivoted to its shorter arm a rod $i^2$, the lower end of which slides in an eye or guide $k^2$, between which and an adjustable collar $l^2$ it is encircled by a spiral spring $m^2$, which tends to force the rod $i^2$ upward and thereby keep the belt Q at all times tightly stretched as required, the spring $m^2$ yielding to the movement of the bell-crank lever R as the pressure roll M and pulley $b^2$ are raised by the increase in diameter of the roll K as the cut strips are wound or reeled up thereon. At the upper ends of the grooves $m'$ are lateral recesses or notches $q^2$, Fig. 2, for the reception of the journals of the pressure roll M when it is desired to hold the same in a raised position out of the way of the roll K.

What I claim as my invention, and desire to secure by Letters Patent, is—

1. In a machine for cutting and winding paper &c., the feed cylinder E provided with a series of removable cutters, combined with a sliding center pin adapted to enter a recess in one end of said cylinder to support the same, a screw adapted to hold the center pin in place, said screw being provided with a handle, and being mounted in a laterally swinging arm $i$, whereby it may be moved to one side to permit the center pin to be withdrawn to release the end of the feed cylinder E when its cutters are to be removed or adjusted, substantially as set forth.

2. In a machine for cutting and winding paper &c., the two friction winding cylinders E, L, revolving in the same direction and adapted to support the roll of cut material being reeled up, combined with a pressure roll adapted to bear on the said roll of cut material, and mechanism for rotating said pressure roll, substantially as set forth.

3. In a machine for cutting and winding paper &c., the two friction winding cylinders E, L, revolving in the same direction, the cylinder L having a greater surface velocity than the cylinder E, and said cylinders being adapted to support the roll of cut material being reeled up, combined with a pressure roll adapted to bear on the said roll of cut material, and mechanism for rotating said pressure roll with a greater surface velocity than that of the winding cylinder L, substantially as set forth.

4. In a machine for cutting and winding paper &c., the combination, with the two friction winding cylinders E, L, revolving in the same direction, of the pressure roll M mounted in arms $p'$, $p'$, connected with and forming a portion of a movable frame, the latter provided with weights and mechanism for rotating the pressure roll M, substantially as described.

5. In a machine for cutting and winding paper &c., the combination of the friction winding cylinders E, L, revolving in the same direction, the pressure roll M mounted in a movable weighted frame and provided with a pinion $w'$, the gear $a^2$ meshing with said pinion and provided with a pulley $b^2$, the gear P provided with a pulley $d^2$, the belt Q connecting the pulleys $b^2$, $d^2$, and passing over independent pulleys $e^2$, $f^2$, mounted on a lever or arm provided with a spring tightening device for maintaining a constant tension on the belt, Q, all constructed to operate substantially in the manner and for the purpose set forth.

Witness my hand this 19th day of May, A. D. 1892.

FRANCIS MEISEL.

In presence of—
P. E. TESCHEMACHER,
HARRY W. AIKEN.